(12) United States Patent
Soriaga et al.

(10) Patent No.: US 11,516,834 B2
(45) Date of Patent: Nov. 29, 2022

(54) UPLINK CONTROL INFORMATION TRANSMISSION

(71) Applicant: QUALCOMM Incorporated, San Diego, CA (US)

(72) Inventors: Joseph Binamira Soriaga, San Diego, CA (US); Yi Huang, San Diego, CA (US); Jing Jiang, San Diego, CA (US); Gabi Sarkis, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/186,802

(22) Filed: Nov. 12, 2018

(65) Prior Publication Data
US 2019/0150179 A1    May 16, 2019

Related U.S. Application Data

(60) Provisional application No. 62/585,383, filed on Nov. 13, 2017.

(51) Int. Cl.
*H04L 12/26* (2006.01)
*H04W 72/12* (2009.01)
(Continued)

(52) U.S. Cl.
CPC ....... *H04W 72/1284* (2013.01); *H04L 1/0003* (2013.01); *H04L 1/1812* (2013.01);
(Continued)

(58) Field of Classification Search
USPC ........ 370/229, 230, 236, 252, 328, 465, 466
See application file for complete search history.

(56) References Cited

U.S. PATENT DOCUMENTS 8,190,092 B1 * 5/2012 Lee ..................... H04L 27/0012
  455/67.11
9,113,459 B2    8/2015 Jang et al.
(Continued)

FOREIGN PATENT DOCUMENTS

CN    102378377 A    3/2012
EP    2086153 A2    8/2009
(Continued)

OTHER PUBLICATIONS

Intel Corporation: "Remaining Issues for Polar Code Construction," 3GPP Draft; R1-1717407, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051340596, 7 Pages, Retrieved from the Internet: URL: http://www.3gpp.org/ftp/Meetings_3GPP_SYNC/RAN1/Docs/ [retrieved on Oct. 8, 2017] section 5.
(Continued)

*Primary Examiner* — Nguyen H Ngo
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of an offset value from a first modulation and coding scheme relating to a first code rate for a payload data transmission. The UE may determine, for a transmission of uplink control information, a second modulation and coding scheme, relating to a second code rate, that is different from the first modulation and coding scheme based at least in part on the offset value. The UE may transmit the uplink control information using the second modulation and coding scheme based at least in part on determining the second modulation and coding scheme. In some aspects, a UE may segment uplink control information. Numerous other aspects are provided.

61 Claims, 7 Drawing Sheets

(51) Int. Cl.
*H04L 5/00* (2006.01)
*H04W 72/04* (2009.01)
*H04W 76/27* (2018.01)
*H04L 1/00* (2006.01)
*H04L 1/18* (2006.01)
*H04W 72/14* (2009.01)
*H04W 28/22* (2009.01)

(52) U.S. Cl.
CPC .......... *H04L 5/0046* (2013.01); *H04L 5/0053* (2013.01); *H04L 5/0076* (2013.01); *H04L 5/0094* (2013.01); *H04W 72/0413* (2013.01); *H04W 72/14* (2013.01); *H04W 76/27* (2018.02); *H04L 5/0055* (2013.01); *H04W 28/22* (2013.01)

(56) References Cited

U.S. PATENT DOCUMENTS

| | | | |
|---|---|---|---|
| 9,912,460 B2* | 3/2018 | Papasakellariou | H04L 5/0053 |
| 10,075,309 B2 | 9/2018 | Chen et al. | |
| 2005/0122928 A1* | 6/2005 | Vijayan | H04L 5/0041 370/312 |
| 2008/0274700 A1* | 11/2008 | Li | H04L 1/0003 455/67.11 |
| 2011/0206089 A1* | 8/2011 | Cho | H04L 5/0016 375/141 |
| 2012/0115534 A1* | 5/2012 | Luo | H04W 52/286 455/522 |
| 2013/0100988 A1* | 4/2013 | Miyoshi | H04B 7/15528 375/211 |
| 2014/0254520 A1 | 9/2014 | Seo et al. | |
| 2014/0269627 A1* | 9/2014 | Gorokhov | H04L 1/0051 370/336 |
| 2015/0326341 A1* | 11/2015 | Lorca Hernando | H04L 5/0044 370/328 |
| 2016/0057636 A1* | 2/2016 | Ibrahim | H04B 7/0417 370/328 |
| 2016/0338127 A1* | 11/2016 | Matsumoto | H04W 72/0406 |
| 2017/0134043 A1* | 5/2017 | Lee | H04L 1/0059 |
| 2018/0041261 A1* | 2/2018 | Modarres Razavi | H04B 7/0656 |
| 2018/0175993 A1* | 6/2018 | Onggosanusi | H04B 7/0486 |
| 2018/0376397 A1 | 12/2018 | Maeda | |
| 2018/0376525 A1* | 12/2018 | Feng | H04L 27/0014 |
| 2019/0007182 A1* | 1/2019 | Li | H04L 1/0025 |
| 2019/0053226 A1* | 2/2019 | Xiong | H04L 5/0091 |
| 2019/0260516 A1* | 8/2019 | Baldemair | H04L 1/1819 |
| 2019/0363855 A1* | 11/2019 | Ogawa | H04L 5/0023 |
| 2019/0387537 A1* | 12/2019 | Zhang | H04L 1/0026 |
| 2020/0052835 A1* | 2/2020 | Xiong | H04L 1/1861 |
| 2020/0068562 A1* | 2/2020 | Wu | H04W 72/0446 |
| 2020/0136750 A1* | 4/2020 | Baldemair | H04L 1/1812 |
| 2020/0296749 A1* | 9/2020 | Freda | H04W 28/0268 |
| 2021/0203459 A1* | 7/2021 | Park | H04L 25/02 |

FOREIGN PATENT DOCUMENTS

| WO | 2015164251 A1 | 10/2015 |
|---|---|---|
| WO | 2016123372 A1 | 8/2016 |

OTHER PUBLICATIONS

International Search Report and Written Opinion—PCT/US2018/060609—ISA/EPO—dated Apr. 24, 2019.
Panasonic: "Discussion on UCI Multiplexing," 3GPP Draft; R1-1718259, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341441, 5 pages, Retrieved from the Internet: URL: http://www.3gpp.org/ftp/Meetings_3GPP_SYNC/RAN1/Docs/ [retrieved on Oct. 8, 2017] section 2.
Taiwan Search Report—TW107140161—TIPO—dated Nov. 11, 2021.

* cited by examiner

UPLINK CONTROL INFORMATION TRANSMISSION

CROSS-REFERENCE TO RELATED APPLICATIONS UNDER 35 U.S.C. § 119

This application claims priority to U.S. Provisional Patent Application No. 62/585,383, filed on Nov. 13, 2017, entitled "TECHNIQUES AND APPARATUSES FOR UPLINK CONTROL INFORMATION TRANSMISSION," which is hereby expressly incorporated by reference herein.

FIELD OF THE DISCLOSURE

Aspects of the present disclosure generally relate to wireless communication, and more particularly to techniques and apparatuses for uplink control information transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via a downlink and an uplink. The downlink (or forward link) is a communication link from the BS to the UE, and the uplink (or reverse link) is a communication link from the UE to the BS. A BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include receiving an indication of an offset value from a first modulation and coding scheme relating to a first code rate for a payload data transmission. The method may include determining, for a transmission of uplink control information, a second modulation and coding scheme, relating to a second code rate, that is different from the first modulation and coding scheme based at least in part on the offset value. The method may include transmitting the uplink control information using the second modulation and coding scheme based at least in part on determining the second modulation and coding scheme.

In some aspects, a user equipment for wireless communication may include memory and one or more processors operatively coupled to the memory. The memory and the one or more processors may be configured to receive an indication of an offset value from a first modulation and coding scheme relating to a first code rate for a payload data transmission. The memory and the one or more processors may be configured to determine, for a transmission of uplink control information, a second modulation and coding scheme, relating to a second code rate, that is different from the first modulation and coding scheme based at least in part on the offset value. The memory and the one or more processors may be configured to transmit the uplink control information using the second modulation and coding scheme based at least in part on determining the second modulation and coding scheme.

In some aspects, a non-transitory computer-readable medium may store one or more instructions for wireless communication. The one or more instructions, when executed by one or more processors of a user equipment, may cause the one or more processors to receive an indication of an offset value from a first modulation and coding scheme relating to a first code rate for a payload data transmission. The one or more instructions, when executed by the one or more processors, may cause the one or more processors to determine, for a transmission of uplink control information, a second modulation and coding scheme, relating to a second code rate, that is different from the first modulation and coding scheme based at least in part on the offset value. The one or more instructions, when executed by the one or more processors, may cause the one or more processors to transmit the uplink control information using the second modulation and coding scheme based at least in part on determining the second modulation and coding scheme.

In some aspects, an apparatus for wireless communication may include means for receiving an indication of an offset value from a first modulation and coding scheme relating to a first code rate for a payload data transmission. The apparatus may include means for determining, for an uplink control information transmission, a second modulation and coding scheme relating to a second code rate that is different from the first modulation and coding scheme based at least in part on the offset value. The apparatus may include means for transmitting the uplink control information using the second modulation and coding scheme based at least in part on determining the second modulation and coding scheme.

In some aspects, a method of wireless communication may include determining that a size of uplink control information for transmission via a channel satisfies a threshold. The method may include segmenting the uplink control information based at least in part on determining that the size of the uplink control information satisfies the threshold. The method may include transmitting the uplink control information via the channel based at least in part on segmenting the uplink control information.

In some aspects, a user equipment for wireless communication may include memory and one or more processors operatively coupled to the memory. The memory and the one or more processors may be configured to determine that a size of uplink control information for transmission via a channel satisfies a threshold. The memory and the one or more processors may be configured to segment the uplink control information based at least in part on determining that the size of the uplink control information satisfies the threshold. The memory and the one or more processors may be configured to transmit the uplink control information via the channel based at least in part on segmenting the uplink control information.

In some aspects, a non-transitory computer-readable medium may store one or more instructions for wireless communication. The one or more instructions, when executed by one or more processors of a user equipment, may cause the one or more processors to determine that a size of uplink control information for transmission via a channel satisfies a threshold. The one or more instructions, when executed by the one or more processors, may cause the one or more processors to segment the uplink control information based at least in part on determining that the size of the uplink control information satisfies the threshold. The one or more instructions, when executed by the one or more processors, may cause the one or more processors to transmit the uplink control information via the channel based at least in part on segmenting the uplink control information.

In some aspects, an apparatus for wireless communication may include means for determining that a size of uplink control information for transmission via a channel satisfies a threshold. The apparatus may include means for segmenting the uplink control information based at least in part on determining that the size of the uplink control information satisfies the threshold. The apparatus may include means for transmitting the uplink control information via the channel based at least in part on segmenting the uplink control information.

Aspects generally include a method, apparatus, device, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
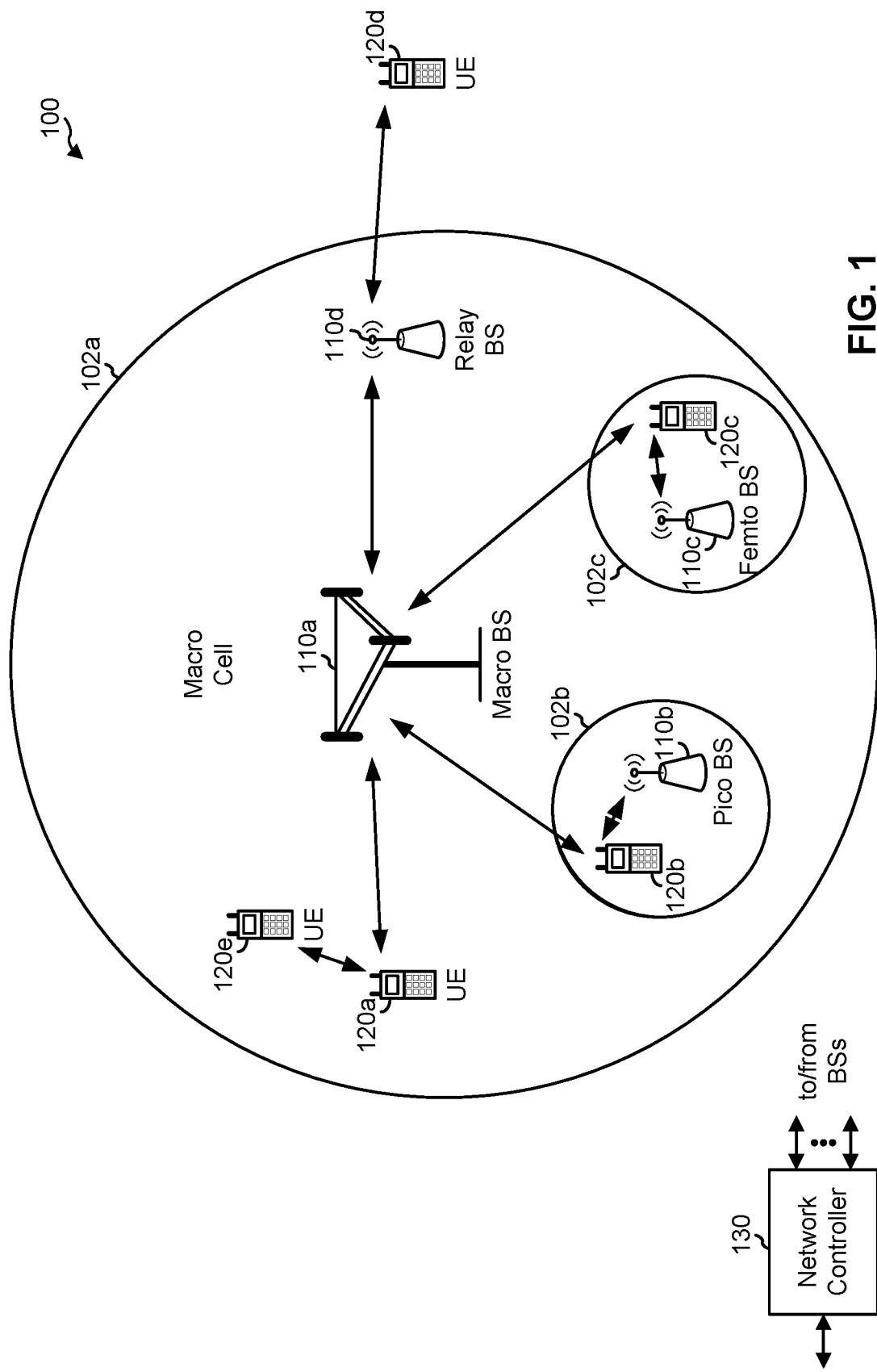
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
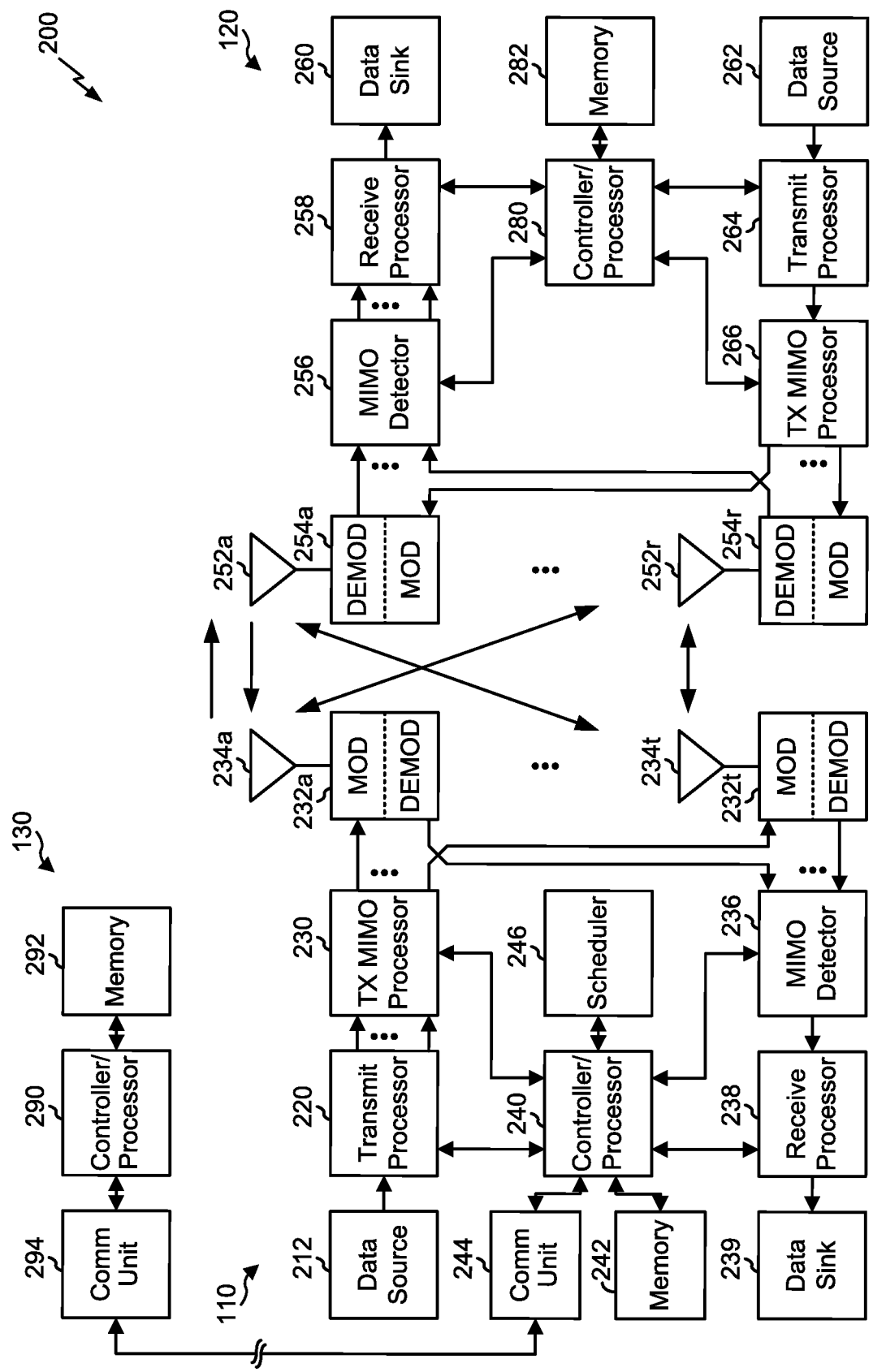
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) depicted in FIG. 2 may perform one or more techniques associated with uplink control information transmission, as described in more detail elsewhere herein. For example, controller/processor 240 of base station 110, controller/processor 280 of UE 120, and/or any other component(s) depicted in FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of an offset value from a first modulation and coding scheme relating to a first code rate for a payload data transmission, means for determining, for a transmission of uplink control information, a second modulation and coding scheme, relating to a second code rate, that is different from the first modulation and coding scheme based at least in part on the offset value, means for transmitting the uplink control information using the second modulation and coding scheme based at least in part on determining the second modulation and coding scheme, and/or the like. In some aspects, UE 120 may include means for determining that a size of uplink control information for transmission via a channel satisfies a threshold, means for segmenting the uplink control information based at least in part on determining that the size of the uplink control information satisfies the threshold, means for transmitting the uplink control information via the channel based at least in part on segmenting the uplink control information, and/or the like. In some aspects, such means may include one or more components of UE 120 described in connection with FIG. 2.

As indicated above, FIG. 2 is provided merely as an example. Other examples may differ from what is described with regard to FIG. 2.

Figure 3:
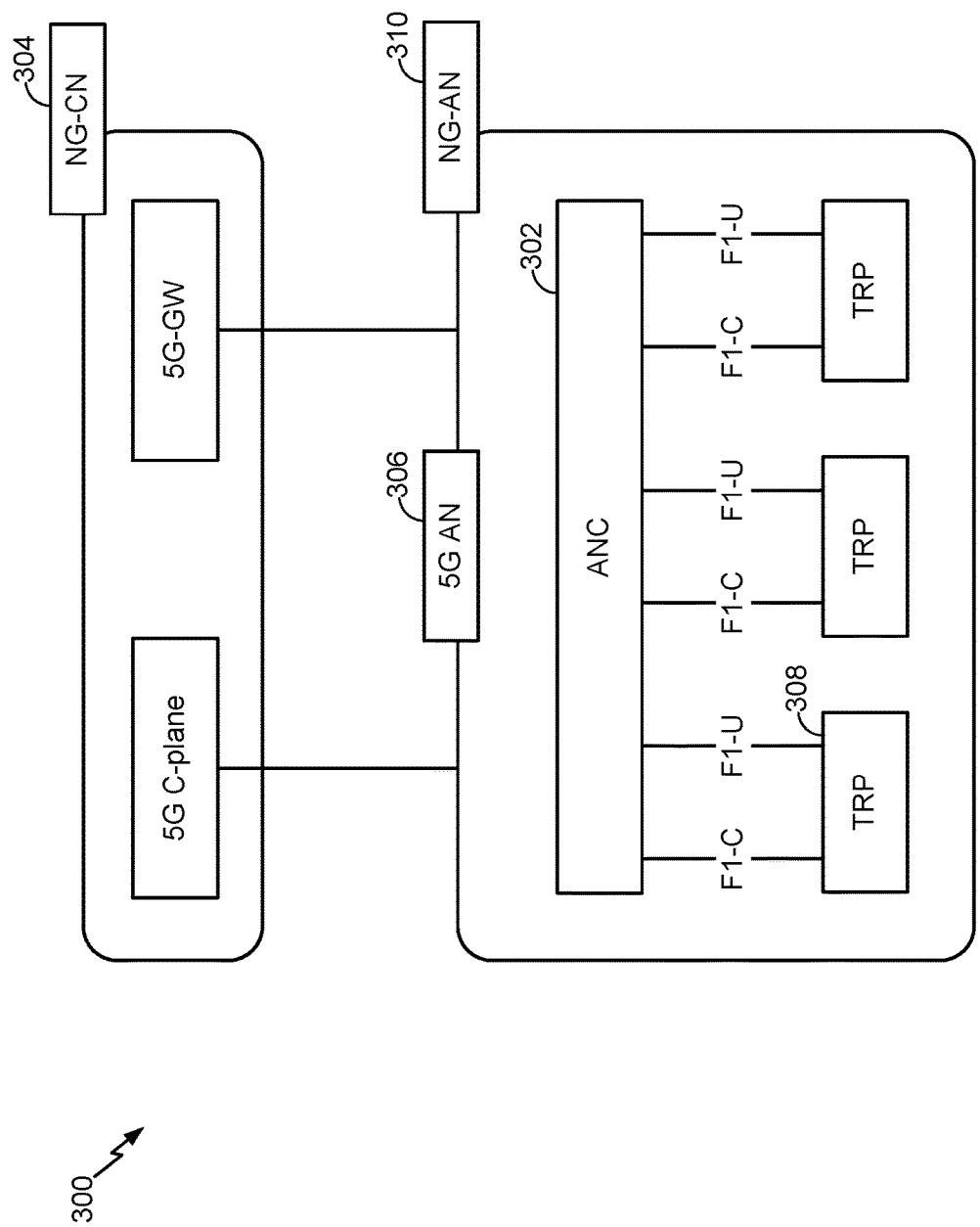
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul. The architecture may be structured to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), media access control (MAC) protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided merely as an example. Other examples may differ from what is described with regard to FIG. 3.

Figure 4:
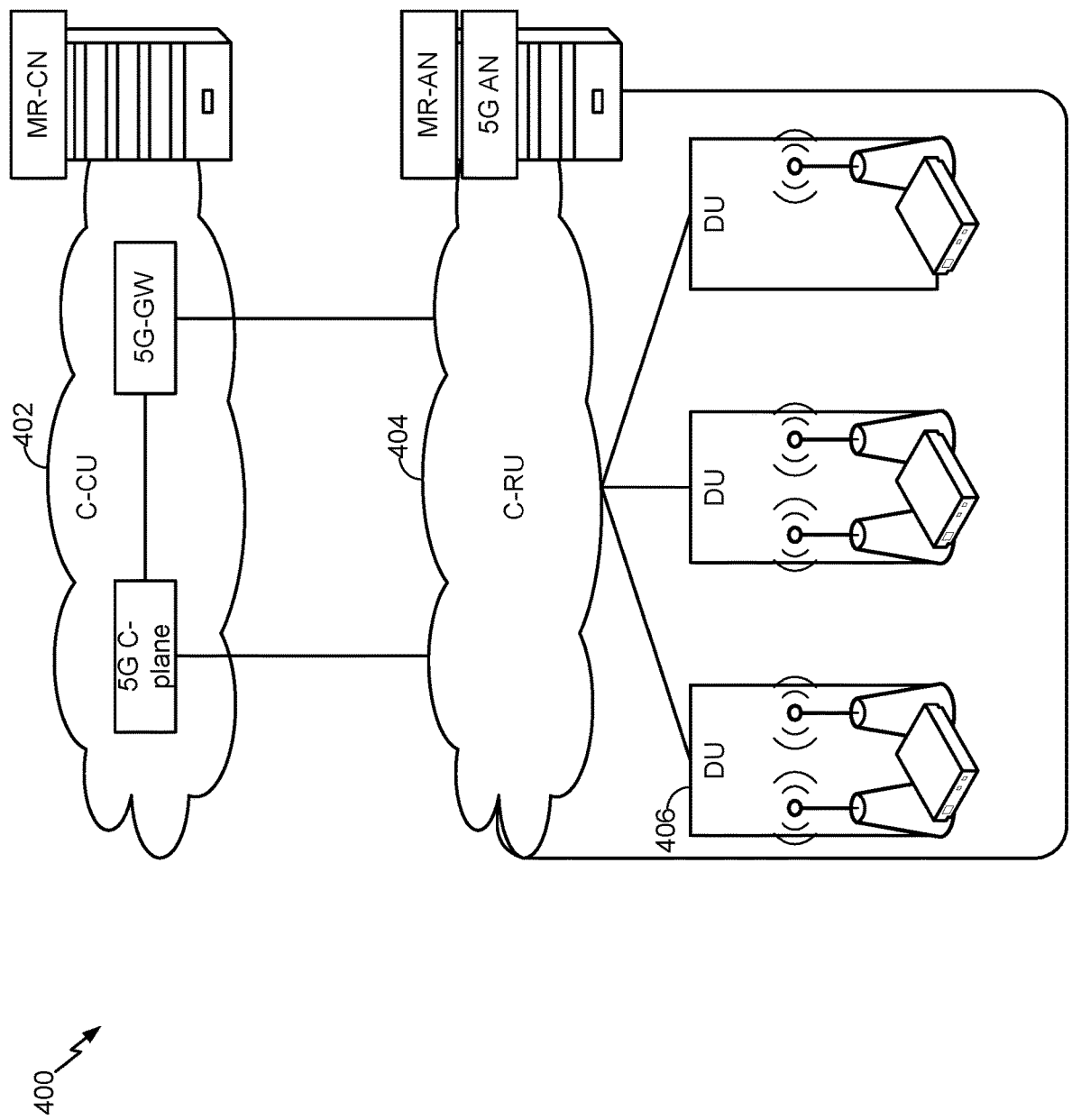
FIG. 4 illustrates an example physical architecture of a distributed RAN, in accordance with various aspects of the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples may differ from what is described with regard to FIG. 4.

A UE may transmit uplink control information and payload data to a BS. In some communications systems, such as LTE, the UE may transmit the uplink control information on an uplink channel, such as a physical uplink shared channel (PUSCH). The UE may transmit the uplink control information and the payload data using a common modulation order. The UE may back off a code rate for the uplink control information relative to the payload data to improve a reliability of the uplink control information relative to the payload data. For example, the uplink control information may be transmitted using a reduced code rate relative to the payload data resulting in a reduced likelihood of loss and/or error in a transmission of the uplink control information. However, using a modulation order associated with the payload data and a backed off code rate may result in relatively poor network performance and/or a relatively inefficient utilization of network resources.

Some aspects, described herein, may determine a first modulation and coding scheme for the uplink control information that is different from a second modulation and coding scheme for the payload data. For example, a UE may determine a first modulation order and/or a first code rate for the uplink control information that is different from a second modulation order and/or a second code rate for the payload data. Additionally, or alternatively, the UE may, for uplink control information that is associated with a threshold size, determine to segment the uplink control information. In this case, the UE may apply a transport block segmentation algorithm to the uplink control information when transmitting the uplink control information.

In this way, the UE may improve network performance (e.g., by reducing a likelihood of loss and/or error in the uplink control information transmission), reduce a utilization of network resources, and/or the like relative to using a common modulation and coding scheme for the uplink control information and the payload data. Moreover, the UE may reuse a transport block transmit chain and segmentation algorithm for uplink control information segmentation, thereby obviating a need for dedicated hardware.

Figure 5:
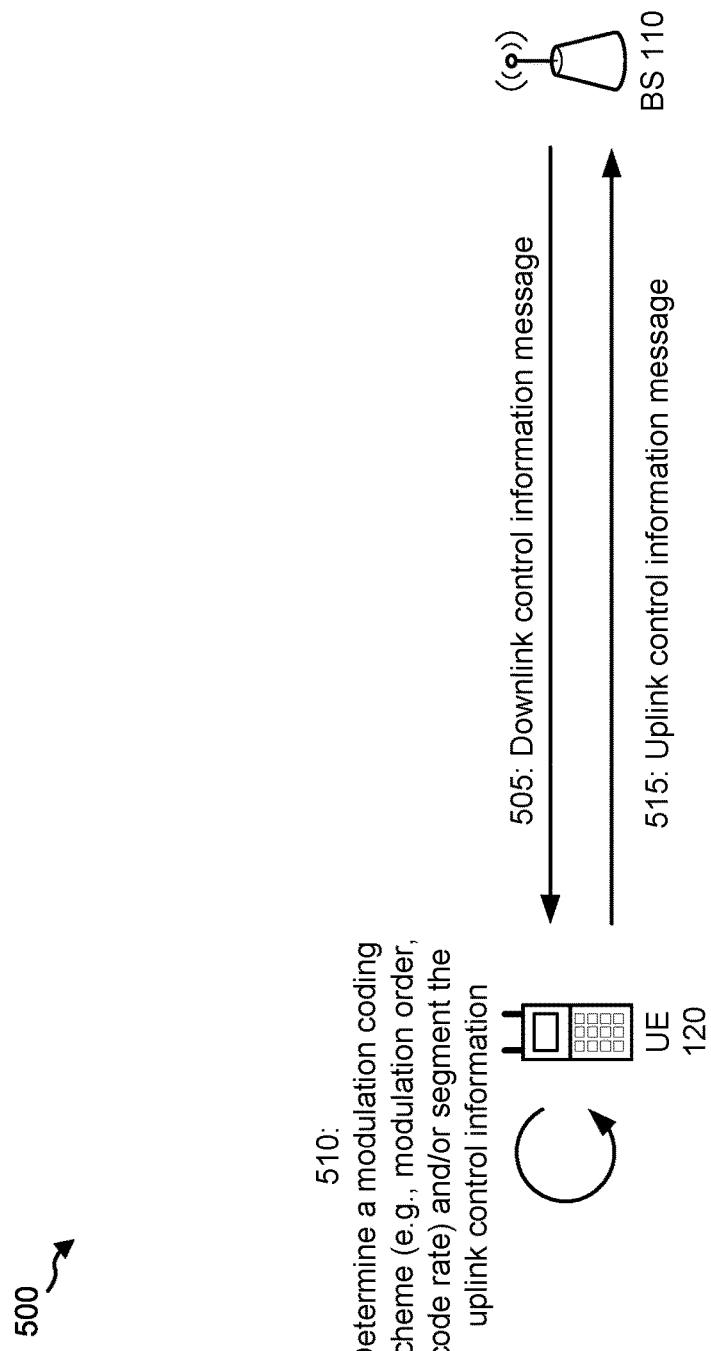
FIG. 5 is a diagram illustrating an example of uplink control information transmission, in accordance with various aspects of the present disclosure.

FIG. 5 is a diagram illustrating an example 500 of uplink control information transmission, in accordance with various aspects of the present disclosure. As shown in FIG. 5, example 500 includes a BS 110 in communication with a UE 120.

As further shown in FIG. 5, and by reference number 505, UE 120 may, in some aspects, receive a downlink control information message from BS 110. For example, UE 120 may receive a downlink control information message that identifies a PUSCH modulation and coding scheme identifier, a beta offset value, and/or the like for an uplink control information transmission by UE 120. In this case, UE 120 may determine a modulation and coding scheme for the uplink control information transmission based at least in part on the PUSCH modulation and coding scheme, the beta offset value (e.g., which may be received in a DCI 0-1 type of message or which may be determined based on RRC signaling), and/or the like. For example, UE 120 may receive a DCI that includes a parameter PUSCH MCS identifying a modulation and coding scheme for a PUSCH and a parameter Beta offset identifying the beta offset value for uplink control information. In this case, UE 120 may determine a parameter SE PUSCH as a product of the code rate and a quadrature amplitude modulation (QAM) order (e.g., 8-QAM, 16-QAM, 32-QAM, 64-QAM, and/or the like). In other words, UE 120 may determine a result of SE PUSCH=code rate*QAM order, where the code rate and QAM order are determined based at least in part on the modulation and coding scheme for the PUSCH.

The parameter SE PUSCH may be a spectral efficiency for the PUSCH. Based at least in part on determining the spectral efficiency for the PUSCH, UE 120 may determine a modulation and code rate for uplink control information as described below. Further UE 120 may determine a back off from the determined spectral efficiency for the PUSCH for uplink control information based on the beta offset. For example, UE 120 may determine a result of SE_UCI=SE PUSCH/Beta Offset, where SE_UCI represents a spectral efficiency for uplink control information that UE 120 is to use to determine a modulation and coding scheme for the uplink control information, as described below. Additionally, or alternatively, when the beta offset is greater than 1, UE 120 may determine a result of code_rate_scale=QAM_UCI/QAM_PUSCH, where code_rate_scale represents a scaling factor for a code rate, QAM_UCI represents an uplink control information QAM order, and QAM_PUSCH represents a PUSCH QAM order. In this case, UE 120 may determine an uplink control information code rate by reducing an uplink control information code rate, determined above, by the scaling factor. Additionally, or alternatively, UE 120 may reduce a quantity of resource elements by the scaling factor to determine the resource allocation.

As further shown in FIG. 5, and by reference number 510, UE 120 may determine a modulation and coding scheme for the uplink control information transmission and/or may segment the uplink control information. For example, UE 120 may determine a first modulation and coding scheme for the uplink control information transmission that is different from a second modulation and coding scheme for a payload data transmission. In some aspects, the first modulation and coding scheme may be associated with a first modulation order and/or a first code rate that differs from a second modulation order and/or a second code rate associated with the second modulation and coding scheme. For example, UE 120 may determine spectral efficiency for the uplink control information transmission based at least in part on the spectral efficiency for the PUSCH and the beta offset value. In this case, UE 120 may determine a largest index of a modulation and coding scheme in a modulation and coding scheme table, such that a product of a code rate and a QAM order of the determined modulation and coding scheme is less than a spectral efficiency for uplink control information determined and described above. For example, UE 120 may determine a code rate and QAM order that are associated with an index value in the modulation and coding scheme table less than the spectral efficiency for the uplink control information transmission. In this case, UE 120 may select the QAM order for modulation of the uplink control information transmission and the code rate for a polar code rate for the uplink control information transmission. In some aspects, UE 120 may rate match based at least in part on the beta offset value.

In some aspects, UE 120 may determine the code rate based at least in part on the QAM order. For example, UE 120 may select the QAM order from the modulation and coding scheme table, and may determine a code rate that is a quotient of the spectral efficiency for the uplink control information transmission and a value for the QAM order. In some aspects, UE 120 may determine the code rate based at least in part on a scaling factor. For example, UE 120 may scale a code rate for the uplink control information relative to a code rate for the PUSCH based at least in part on a scaling of a QAM order for the uplink control information relative to a QAM order for the PUSCH and the beta offset value. Additionally, or alternatively, UE 120 may scale a resource element allocation for the uplink control information relative to a resource allocation for the PUSCH based at least in part on the scaling of the QAM order for the uplink control information relative to the QAM order for the PUSCH and the beta offset value.

In some aspects, UE 120 may determine a resource allocation relating to the modulation and coding scheme for the uplink control information transmission. For example, UE 120 may determine a quantity of resource elements for the uplink control information transmission based at least in part on a quantity of bits of uplink control information that are to be transmitted and the spectral efficiency of the uplink control information. In this case, the quantity of resource elements, RE, may equal a quotient of a quantity of bits of the uplink control information and a spectral efficiency for uplink control information determined and described above (e.g., based on a QAM order, based on a code rate, etc.) or an actual spectral efficiency achievable for the uplink control information (based on the QAM order, based on the code rate, etc.). In other words, UE 120 may determine a result of #REs=nBits_UCI/SE_UCI*, where #REs is a quantity of resource elements for which resources are to be allocated, nBits_UCI represents a quantity of bits of uplink control information, and SE_UCI* represents an actual spectral efficiency of uplink control information determined based at least in part on a calculated maximum spectral efficiency, a code rate, and a QAM order, as described above.

In some aspects, UE 120 may include one or more additional resource elements based at least in part on the quantity of bits of the uplink control information and the spectral efficiency. For example, UE 120 may determine that a first quantity of whole resource elements and a partial resource element are to be used to transmit the uplink control information, and may determine to allocate a complete resource element for the uplink control information transmission rather than a partial resource element. In some aspects, UE 120 may determine a resource allocation for the PUSCH. For example, UE 120 may determine a quantity of remaining resource elements after allocating one or more resource elements for the uplink control information transmission, and may allocate the remaining resource elements for the PUSCH.

In some aspects, UE 120 may determine to segment the uplink control information using a data channel transport block segmentation algorithm. For example, UE 120 may reuse a hardware transmit chain for segmentation of the uplink control information based at least in part on an uplink control information size (e.g., a size of the uplink control information, a quantity of bits of the uplink control information, a coded bit length for the uplink control information, and/or the like) satisfying a threshold. In some aspects, UE 120 may utilize a cyclic redundancy check (CRC) when applying segmentation to the uplink control information. For example, UE 120 may utilize a transport block CRC, a code block CRC, and/or the like for the uplink control information. In some aspects, UE 120 may determine rate matching for the uplink control information transmission. For example, UE 120 may determine to rate match based at least in part on a grant allocation (e.g., a grant for a PUSCH with uplink control information and not other information), a grant allocation and a beta offset value (e.g., a grant for a PUSCH with uplink control information and payload data), and/or the like. In some aspects, UE 120 may determine to utilize a redundancy version (e.g., type 0 (RV=0) or another configured version) for rate matching, such as based at least in part on stored information, a message from B S 110, and/or the like. In some aspects, UE 120 may determine to rate match based at least in part on a quantity of resource elements. For example, UE 120 may use a quantity of resource elements determined for uplink control information, as described above, to determine an allocation on which to rate match. In this case, the allocation may be a grant, a grant and a beta offset value, and/or the like. Further, UE 120 may use the redundancy version, described above, for rate matching, which may be configured and/or signaled in layer 1.

In this way, UE 120 enables transmit chain re-use based at least in part on applying the transport block segmentation algorithm for the uplink control information. Moreover, a decoder for the PUSCH with the uplink control information transmission may be enabled using a code rate for the uplink control information and a coordinated beam switching switch for payload data transmissions and uplink control information transmissions. Further, UE 120 enables improve performance at larger blocklengths regardless of kernel size relative to polar code. Further UE 120 improves performance relative to polar code with uplink control information kernel size restriction. Further, UE 120 may enable reuse of a complete hardware transmit chain for transport block segmentation, which improves device complexity. Further, UE 120 may reduce a decoder complexity for PUSCH decoding.

As further shown in FIG. 5, and by reference number 515, UE 120 may transmit the uplink control information using the modulation and coding scheme. For example, UE 120 may transmit the uplink control information using a first modulation order that is different from a second modulation order associated with a payload data transmission, a first code rate that is different from a second code rate associated with a payload data transmission, and/or the like. Additionally, or alternatively, UE 120 may transmit the uplink control information using transport block segmentation to segment transport blocks conveying the uplink control information.

As indicated above, FIG. 5 is provided as an example. Other examples may differ from what is described with respect to FIG. 5.

Figure 6:
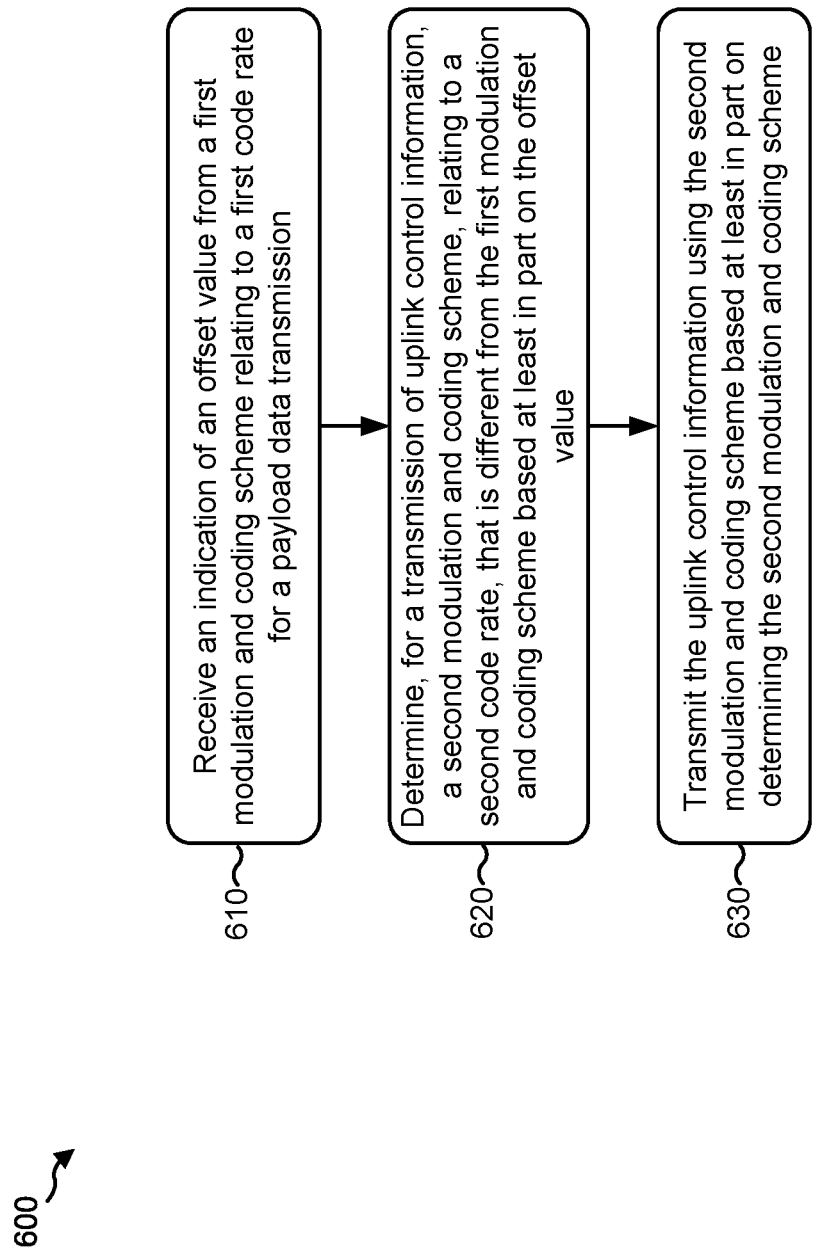
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs uplink control information transmission.

As shown in FIG. 6, in some aspects, process 600 may include receiving an indication of an offset value from a first modulation and coding scheme relating to a first code rate for a payload data transmission (block 610). For example, the UE (e.g., using antenna 252, DEMOD 254, MIMO detector 256, receive processor 258, controller/processor 280, and/or the like) may receive an indication of an offset value from a first modulation and coding scheme relating to a first code rate for a payload data transmission, as described in more detail above.

As shown in FIG. 6, in some aspects, process 600 may include determining, for a transmission of uplink control information, a second modulation and coding scheme, relating to a second code rate, that is different from the first modulation and coding scheme based at least in part on the offset value (block 620). For example, the UE (e.g., using controller/processor 280 and/or the like) may determine, for a transmission of uplink control information, a second modulation and coding scheme, relating to a second code rate, that is different from the first modulation and coding scheme based at least in part on the offset value, as described in more detail above. In some aspects, the UE may determine a modulation and coding scheme to use for data transmission, may determine a modulation and coding scheme for control information, may determine a resource allocation for data transmission, may determine a resource allocation for control information, and/or may code and modulate the data and the control information using first resource elements for data transmission and second resource elements for control information. In some aspects, the UE may perform spatial precoding (e.g., using OFDM, DFT-s-OFDM, and/or the like).

As further shown in FIG. 6, in some aspects, process 600 may include transmitting the uplink control information using the second modulation and coding scheme based at least in part on determining the second modulation and coding scheme (block 630). For example, the UE (e.g., using controller/processor 280, transmit processor 264, TX MIMO processor 266, MOD 254, antenna 252, and/or the like) may transmit the uplink control information using the second modulation and coding scheme based at least in part on determining the second modulation and coding scheme, as described in more detail above. In some aspects, the UE may transmit based on modulating and coding using the first modulation and coding scheme.

Process 600 may include additional aspects, such as any single aspect or any combination of aspects described below and/or in connection with one or more other processes described elsewhere herein.

In some aspects, the first modulation and coding scheme relates to a first modulation order that is different from a second modulation order relating to the second modulation and coding scheme. In some aspects, the second modulation and coding scheme relates to a second code rate that is different from a first code rate relating to the first modulation and coding scheme. In some aspects, the second modulation and coding scheme is determined based at least in part on a downlink control information (DCI) message or a radio resource control (RRC) message.

In some aspects, the second modulation and coding scheme is determined based at least in part on an uplink channel modulation and coding scheme. In some aspects, the second modulation and coding scheme is determined based at least in part on an offset value or a scaling value relative to the first modulation and coding scheme. In some aspects, the offset value is a scaling value. In some aspects, the second modulation and coding scheme is determined based at least in part on information in a modulation and coding scheme table, and the modulation and coding scheme table stores information identifying a set of modulation orders and a corresponding set of code rates. In some aspects, the uplink control information is transmitted using a resource allocation determined based at least in part on a quantity of resource elements associated with the second modulation and coding scheme.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
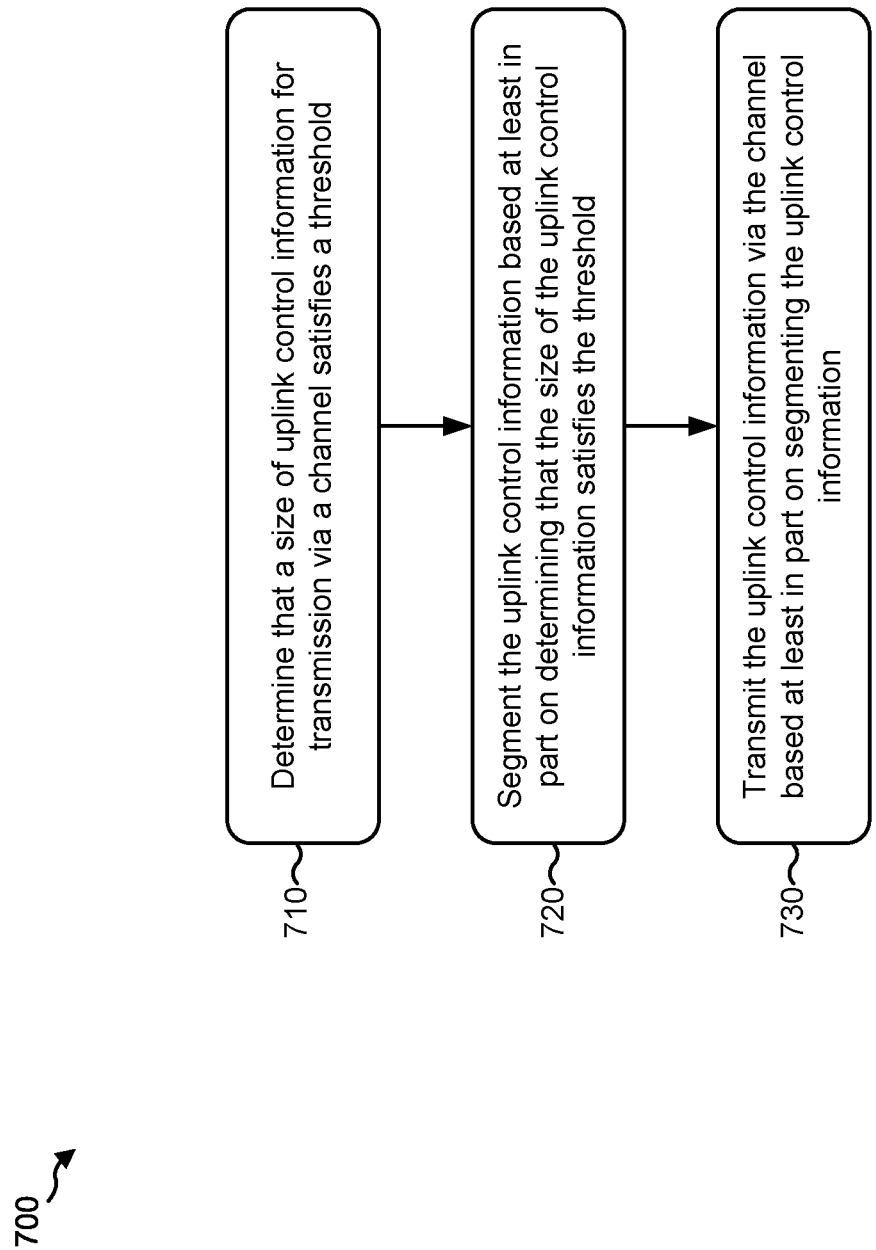
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs uplink control information transmission.

As shown in FIG. 7, in some aspects, process 700 may include determining that a size of uplink control information for transmission via a channel satisfies a threshold (block 710). For example, the UE (e.g., using controller/processor 280 and/or the like) may determine that the size of the uplink control information satisfies the threshold, as described in more detail above.

As further shown in FIG. 7, in some aspects, process 700 may include segmenting the uplink control information based at least in part on determining that the size of the uplink control information satisfies the threshold (block 720). For example, the UE (e.g., using controller/processor 280, transmit processor 264, TX MIMO processor 266, MOD 254, antenna 252, and/or the like) may segment the uplink control information based at least in part on determining that the size of the uplink control information satisfies the threshold. In some aspects, the UE may use a transport block segmentation algorithm for segmenting the uplink control information or another similar segmentation algorithm, as described in more detail above. In some aspects, the UE may reuse a redundancy check. For example, for uplink control information segmentation, the UE may use a common transport block-level cyclic redundancy check, code block-level cyclic redundancy check, and/or the like as described above and as described below.

As further shown in FIG. 7, in some aspects, process 700 may include transmitting the uplink control information via the channel based at least in part on segmenting the uplink control information (block 730). For example, the UE (e.g., using controller/processor 280, transmit processor 264, TX MIMO processor 266, MOD 254, antenna 252, and/or the like) may transmit the uplink control information via the channel based at least in part on segmenting the uplink control information, as described in more detail above.

Process 700 may include additional aspects, such as any single aspect or any combination of aspects described below and/or in connection with one or more other processes described elsewhere herein.

In some aspects, the UE may determine a first modulation and coding scheme for the uplink control information that is different from a second modulation and coding scheme for a payload data transmission, and may transmit the uplink control information using the first modulation and coding scheme. In some aspects, the UE may determine a code rate associated with the uplink control information, and may segment the uplink control information based at least in part on determining the code rate associated with the uplink control information. In some aspects, the UE may segment a payload of the uplink control information for transmission.

In some aspects, the UE may apply a transport block segmentation algorithm to the uplink control information. In some aspects, the UE may rate match based at least in part on a grant for the uplink control information. In some aspects, the UE may rate match based at least in part on an offset value. In some aspects, the transmitting is a hybrid automatic repeat request (HARQ) transmission, and a start point for the transmission is determined based at least in part on a redundancy version (e.g., type 0 (RV=0) or another configured redundancy version). In some aspects, the transmitting the uplink control information includes transmitting the uplink control information using a data channel coding chain.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining, for a transmission of uplink control information, a first modulation and coding scheme, relating to a first code rate, based at least in part on a spectral efficiency of the uplink control information,
        wherein the spectral efficiency of the uplink control information is based at least in part on:
            a spectral efficiency of a physical uplink shared channel (PUSCH), and
            an offset value associated with a second modulation and coding scheme, relating to a second code rate for a payload data transmission, different from the first modulation and coding scheme; and transmitting the uplink control information using the first modulation and coding scheme.

2. The method of claim 1, wherein the second modulation and coding scheme relates to a second modulation order that is different from a first modulation order relating to the first modulation and coding scheme.

3. The method of claim 1, further comprising:
receiving an indication of the offset value and the second modulation and coding scheme.

4. The method of claim 3, wherein the indication of the offset value and the second modulation and coding scheme is received via a radio resource control message.

5. The method of claim 1, wherein the offset value is a scaling value relative to the second modulation and coding scheme.

6. The method of claim 1, wherein the first modulation and coding scheme is determined based at least in part on information in a modulation and coding scheme table; and
wherein the modulation and coding scheme table stores information identifying a set of modulation orders and a corresponding set of code rates.

7. The method of claim 1, wherein the uplink control information is transmitted using a resource allocation determined based at least in part on a quantity of resource elements associated with the first modulation and coding scheme.

8. The method of claim 1, wherein the first code rate is scaled relative to the second code rate based at least in part on a modulation order for the uplink control information relative to a modulation order for the payload data transmission and the offset value.

9. A user equipment (UE) for wireless communication, comprising:
a memory; and
one or more processors coupled to the memory, the one or more processors configured to:
determine, for a transmission of uplink control information, a first modulation and coding scheme, relating to a first code rate, based at least in part on a spectral efficiency of the uplink control information,
wherein the spectral efficiency of the uplink control information is based at least in part on:
a spectral efficiency of a physical uplink shared channel (PUSCH), and
an offset value associated with a second modulation and coding scheme, relating a second code rate for a payload data transmission, different from the first modulation and coding scheme; and
transmit the uplink control information using the first modulation and coding scheme.

10. The UE of claim 9, wherein the second modulation and coding scheme relates to a second modulation order that is different from a first modulation order relating to the first modulation and coding scheme.

11. The UE of claim 9, wherein the UE is configured to receive an indication of the offset value and the second modulation and coding scheme.

12. The UE of claim 11, wherein the indication of the offset value and the second modulation and coding scheme is received via a radio resource control message.

13. The UE of claim 9, wherein the offset value is a scaling value relative to the second modulation and coding scheme.

14. The UE of claim 9, wherein the first modulation and coding scheme is determined based at least in part on information in a modulation and coding scheme table; and
wherein the modulation and coding scheme table stores information identifying a set of modulation orders and a corresponding set of code rates.

15. The UE of claim 9, wherein the uplink control information is transmitted using a resource allocation determined based at least in part on a quantity of resource elements associated with the first modulation and coding scheme.

16. The UE of claim 9, wherein the first code rate is scaled relative to the second code rate based at least in part on a modulation order for the uplink control information relative to a modulation order for the payload data transmission and the offset value.

17. A non-transitory computer-readable medium storing one or more instructions for wireless communication, that when executed by one or more processors of a user equipment (UE), cause the UE to:
determine, for a transmission of uplink control information, a first modulation and coding scheme, relating to a first code rate, that is based at least in part on a spectral efficiency of the uplink control information,
wherein the spectral efficiency of the uplink control information is based at least in part on:
a spectral efficiency of a physical uplink shared channel (PUSCH), and
an offset value associated with a second modulation and coding scheme, relating a second code rate for a payload data transmission, different from the first modulation and coding scheme; and
transmit the uplink control information using the first modulation and coding scheme.

18. The non-transitory computer-readable medium of claim 17, wherein the second modulation and coding scheme relates to a second modulation order that is different from a first modulation order relating to the first modulation and coding scheme.

19. The non-transitory computer-readable medium of claim 17, wherein the UE is configured to receive an indication of the offset value and the second modulation and coding scheme via a downlink control information message or a radio resource control.

20. The non-transitory computer-readable medium of claim 17, wherein the offset value is a scaling value relative to the second modulation and coding scheme.

21. The non-transitory computer-readable medium of claim 17, wherein the first modulation and coding scheme is determined based at least in part on information in a modulation and coding scheme table; and
wherein the modulation and coding scheme table stores information identifying a set of modulation orders and a corresponding set of code rates.

22. The non-transitory computer-readable medium of claim 17, wherein the uplink control information is transmitted using a resource allocation determined based at least in part on a quantity of resource elements associated with the first modulation and coding scheme.

23. The non-transitory computer-readable medium of claim 17, wherein the first code rate is scaled relative to the second code rate based at least in part on a modulation order for the uplink control information relative to a modulation order for the payload data transmission and the offset value.

24. An apparatus for wireless communication, comprising:
means for transmitting uplink control information, a first modulation and coding scheme, relating to a first code rate, based at least in part on a spectral efficiency of the uplink control information, wherein the spectral efficiency of the uplink control information is based at least in part on:
a spectral efficiency of a physical uplink shared channel (PUSCH), and
an offset value associated with a second modulation and coding scheme, relating a second code rate for a payload data transmission, different from the first modulation and coding scheme; and
means for transmitting the uplink control information using the first modulation and coding scheme.

25. The apparatus of claim 24, wherein the second modulation and coding scheme relates to a second modulation order that is different from a first modulation order relating to the first modulation and coding scheme.

26. The apparatus of claim 24, further comprising means for receiving an indication of the offset value and the second modulation and coding scheme via a downlink control information message or a radio resource control message.

27. The apparatus of claim 24, wherein the offset value is a scaling value relative to the second modulation and coding scheme.

28. The apparatus of claim 24, wherein the first modulation and coding scheme is determined based at least in part on information in a modulation and coding scheme table; and
wherein the modulation and coding scheme table stores information identifying a set of modulation orders and a corresponding set of code rates.

29. The apparatus of claim 24, wherein the uplink control information is transmitted using a resource allocation determined based at least in part on a quantity of resource elements associated with the first modulation and coding scheme.

30. The apparatus of claim 24, wherein the first code rate is scaled relative to the second code rate based at least in part on a modulation order for the uplink control information relative to a modulation order for the payload data transmission and the offset value.

31. A method of wireless communication performed by a user equipment (UE), comprising:
determining, for a transmission of uplink control information, a first modulation and coding scheme, relating to a first code rate, based at least in part on:
a spectral efficiency of the uplink control information, and
a resource allocation for the transmission of the control information,
wherein the first modulation and coding scheme is different from a second modulation and coding scheme relating a second code rate for a payload data transmission; and
transmitting the uplink control information using the first modulation and coding scheme.

32. The method of claim 31, wherein the second modulation and coding scheme relates to a second modulation order that is different from a first modulation order relating to the first modulation and coding scheme.

33. The method of claim 31, further comprising:
receiving an indication of the second modulation and coding scheme via a downlink control information message or a radio resource control message.

34. The method of claim 31, wherein the spectral efficiency is based at least in part on an offset value associated with the second modulation and coding scheme.

35. The method of claim 34, wherein the offset value is a scaling value relative to the second modulation and coding scheme.

36. The method of claim 31, further comprising:
determining a quantity of necessary resource elements for the transmission of the uplink control information based at least in part on a quantity of bits of the uplink control information and the spectral efficiency of the uplink control information;
determining a quantity of remaining resource elements based at least in part on determining the quantity of necessary resource elements; and
determining the resource allocation based at least in part on the quantity of necessary resource elements and the quantity of remaining resource elements.

37. The method of claim 36, further comprising:
allocating one or more necessary resource elements for the transmission of the uplink control information based at least in part on determining the quantity of necessary resource elements for the transmission of the uplink control information,
wherein determining the resource allocation comprises:
allocating one or more additional resources for the transmission of the uplink control information based at least in part on allocating the one or more necessary resource elements and determining the quantity of remaining resource elements.

38. The method of claim 31, wherein the second code rate is based on at least one of a quadrature amplitude modulation (QAM) order or a scaling factor.

39. A user equipment (UE) for wireless communication, comprising:
a memory; and
one or more processors coupled to the memory, the one or more processors configured to:
determine, for a transmission of uplink control information, a first modulation and coding scheme, relating to a first code rate, based at least in part on:
a spectral efficiency of the uplink control information, and
a resource allocation for the transmission of the control information, wherein the first modulation and coding scheme is different from a second modulation and coding scheme relating to a second code rate for a payload data transmission; and
transmit the uplink control information using the first modulation and coding scheme.

40. The UE of claim 39, wherein the second modulation and coding scheme relates to a second modulation order that is different from a first modulation order relating to the first modulation and coding scheme.

41. The UE of claim 39, wherein the one or more processors are further configured to:
receive an indication of the second modulation and coding scheme via a downlink control information message or a radio resource control message.

42. The UE of claim 39, wherein the spectral efficiency is based at least in part on an offset value associated with the second modulation and coding scheme.

43. The UE of claim 42, wherein the offset value is a scaling value relative to the first modulation and coding scheme.

44. The UE of claim 39, wherein the one or more processors are further configured to:
determine a quantity of necessary resource elements for the transmission of the uplink control information based at least in part on a quantity of bits of the uplink control information and the spectral efficiency of the uplink control information;

determine a quantity of remaining resource elements based at least in part on determining the quantity of necessary resource elements; and determine the resource allocation based at least in part on the quantity of necessary resource elements and the quantity of remaining resource elements.

45. The UE of claim 44, wherein the one or more processors are further configured to:

allocate one or more necessary resource elements for the transmission of the uplink control information based at least in part on determining the quantity of necessary resource elements for the transmission of the uplink control information, wherein the one or more processors, to determine the resource allocation, are configured to:

allocate one or more additional resources for the transmission of the uplink control information based at least in part on allocating the one or more necessary resource elements and determining the quantity of remaining resource elements.

46. The UE of claim 39, wherein the second code rate is based on at least one of a quadrature amplitude modulation (QAM) order or a scaling factor.

47. A non-transitory computer-readable medium storing one or more instructions for wireless communication, that when executed by one or more processors of a user equipment (UE), cause the UE to:

determine, for a transmission of uplink control information, a first modulation and coding scheme, relating to a first code rate, based at least in part on:

a spectral efficiency of the uplink control information, and a resource allocation for the transmission of the uplink control information, wherein the first modulation and coding scheme is different from a second modulation and coding scheme relating a second code rate for a payload data transmission; and transmit the uplink control information using the first modulation and coding scheme.

48. The non-transitory computer-readable medium of claim 47, wherein the second modulation and coding scheme relates to a second modulation order that is different from a first modulation order relating to the first modulation and coding scheme.

49. The non-transitory computer-readable medium of claim 47, wherein the one or more instructions further cause the UE to:

receive an indication of the second modulation and coding scheme via a downlink control information message or a radio resource control message.

50. The non-transitory computer-readable medium of claim 47, wherein the spectral efficiency is based at least in part on an offset value associated with the second modulation and coding scheme.

51. The non-transitory computer-readable medium of claim 50, wherein the offset value is a scaling value relative to the second modulation and coding scheme.

52. The non-transitory computer-readable medium of claim 47, wherein the one or more instructions further cause the UE to:

determine a quantity of necessary resource elements for the transmission of the uplink control information based at least in part on a quantity of bits of the uplink control information and the spectral efficiency of the uplink control information;

determine a quantity of remaining resource elements based at least in part on determining the quantity of necessary resource elements; and determine the resource allocation based at least in part on the quantity of necessary resource elements and the quantity of remaining resource elements.

53. The non-transitory computer-readable medium of claim 52, wherein the one or more instructions further cause the UE to:

allocate one or more necessary resource elements for the transmission of the uplink control information based at least in part on determining the quantity of necessary resource elements for the transmission of the uplink control information, wherein the one or more instructions that cause the UE to determine the resource allocation, cause the UE to:

allocate one or more additional resources for the transmission of the uplink control information based at least in part on allocating the one or more necessary resource elements and determining the quantity of remaining resource elements.

54. The non-transitory computer-readable medium of claim 47, wherein the second code rate is based on at least one of a quadrature amplitude modulation (QAM) order or a scaling factor.

55. An apparatus for wireless communication, comprising:

means for determining, for a transmission of uplink control information, a first modulation and coding scheme, relating to a first code rate, based at least in part on:

a spectral efficiency of the uplink control information, and a resource allocation for the transmission of the control information, wherein the first modulation and coding scheme is different from a second modulation and coding scheme relating to a second code rate for a payload data transmission; and means for transmitting the uplink control information using the first modulation and coding scheme.

56. The apparatus of claim 55, wherein the second modulation and coding scheme relates to a second modulation order that is different from a first modulation order relating to the first modulation and coding scheme.

57. The apparatus of claim 55, further comprising:

means for receiving an indication of the second modulation and coding scheme via a downlink control information message or a radio resource control message.

58. The apparatus of claim 55, wherein the spectral efficiency is based at least in part on an offset value associated with the second modulation and coding scheme.

59. The apparatus of claim 58, wherein the offset value is a scaling value relative to the first modulation and coding scheme.

60. The apparatus of claim 55, further comprising:

means for determining a quantity of necessary resource elements for the transmission of the uplink control information based at least in part on a quantity of bits of the uplink control information and the spectral efficiency of the uplink control information;

means for determining a quantity of remaining resource elements based at least in part on determining the quantity of necessary resource elements; and means for determining the resource allocation based at least in part on the quantity of necessary resource elements and the quantity of remaining resource elements.

61. The apparatus of claim 60, further comprising:
means for allocating one or more necessary resource elements for the transmission of the uplink control information based at least in part on determining the quantity of necessary resource elements for the transmission of the uplink control information,
   wherein means for determining the resource allocation comprises:
      means for allocating one or more additional resources for the transmission of the uplink control information based at least in part on allocating the one or more necessary resource elements and determining the quantity of remaining resource elements.

\* \* \* \* \*